US009031574B2

(12) United States Patent
Pan et al.

(10) Patent No.: US 9,031,574 B2
(45) Date of Patent: May 12, 2015

(54) LOCATION ESTIMATION BASED ON ADJUSTED DISTANCE VALUES FOR A WIRELESS DEVICE

(71) Applicant: Intel Corporation, Santa Clara, CA (US)

(72) Inventors: Xiaoyong Pan, Shanghai (CN); Justin Lipman, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 13/997,913

(22) PCT Filed: Oct. 12, 2012

(86) PCT No.: PCT/CN2012/082843
§ 371 (c)(1),
(2) Date: Jun. 25, 2013

(87) PCT Pub. No.: WO2014/056183
PCT Pub. Date: Apr. 17, 2014

(65) Prior Publication Data
US 2014/0243011 A1    Aug. 28, 2014

(51) Int. Cl.
*H04W 4/02* (2009.01)
*H04W 64/00* (2009.01)
*H04W 84/22* (2009.01)

(52) U.S. Cl.
CPC ............. *H04W 4/023* (2013.01); *H04W 64/00* (2013.01); *H04W 84/22* (2013.01)

(58) Field of Classification Search
CPC ...................................... H04W 4/02
USPC ...................... 455/456.1, 517, 446
See application file for complete search history.

(56) References Cited

U.S. PATENT DOCUMENTS

| 2007/0093213 A1* | 4/2007 | Filizola et al. | 455/67.16 |
| 2009/0191891 A1* | 7/2009 | Ma et al. | 455/456.1 |
| 2011/0287801 A1* | 11/2011 | Levin et al. | 455/517 |

FOREIGN PATENT DOCUMENTS

| CN | 102170697 A | 8/2001 |
| CN | 101466070 A | 6/2009 |
| CN | 101631349 A | 1/2010 |
| WO | WO2005091905 A2 | 10/2005 |

OTHER PUBLICATIONS

International Search Report and Written Opinion mailed Jul. 18, 2013 for International Application No. PCT/CN2012/082843, 10 pages.

* cited by examiner

*Primary Examiner* — Jinsong Hu
*Assistant Examiner* — Jean Chang
(74) *Attorney, Agent, or Firm* — Schwabe, Williamson & Wyatt, P.C.

(57) ABSTRACT

Embodiments of techniques and systems for distance and location estimation in wireless systems are described. In embodiments, a wireless device may receive wireless signals from reference points in a spatial arrangement. The wireless device may identify a closest reference point and generate arrangement-based distance values for each of the reference points based on a propagation model. The wireless device may adjust the propagation model based on the received wireless signals and the arrangement-based distance values, and may generate adjusted distance values using the adjusted propagation model. The wireless device may use the adjusted distance values and the spatial arrangement to estimate the location of the wireless device. Other embodiments may be described and claimed.

25 Claims, 10 Drawing Sheets

US 9,031,574 B2

LOCATION ESTIMATION BASED ON ADJUSTED DISTANCE VALUES FOR A WIRELESS DEVICE

CROSS REFERENCE TO RELATED APPLICATIONS

The present application is a national phase entry under 35 U.S.C. §371 of International Application No. PCT/CN2012/082843, filed Oct. 12, 2012, entitled "LOCATION ESTIMATION BASED ON ADJUSTED DISTANCE VALUES FOR A WIRELESS DEVICE", which designated, among the various States, the United States of America. The Specification of the PCT/CN2012/082843 Application is hereby incorporated by reference.

TECHNICAL FIELD

The present disclosure relates generally to wireless communication networks, and more particularly, to methods and apparatus for estimating distances between devices in a wireless communication network in order to, for example, determine the location of one or more of the devices.

BACKGROUND

A number of technologies attempt to identify the location of mobile devices by estimating the distance between the devices and known beacon locations. In some such methods, a mobile device measures the received strength of wireless signals sent by multiple beacons, applies a wireless propagation model to the received signal strength values to estimate the distances between the mobile device and the beacons, and applies a trilateration technique (e.g., the method of circles) to the estimated distances to identify a likely location of the mobile device.

However, simple propagation models do not account for common environmental factors that can significantly affect the strength of received signals, such as walls and other barriers, mobile device casings, and orientation and obstruction of the antenna. More complex models require computational power beyond that available in a mobile device, or a high degree of prior knowledge of the physical surroundings of the mobile device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of techniques and systems for distance and location estimation in wireless systems are described. In embodiments, a wireless device may receive wireless signals from reference points in a spatial arrangement. The wireless device may identify a closest reference point and generate arrangement-based distance values for each of the reference points based on a propagation model. The wireless device may adjust the propagation model based on the received wireless signals and the arrangement-based distance values, and may generate adjusted distance values using the adjusted propagation model. The wireless device may use the adjusted distance values and the spatial arrangement to estimate the location of the wireless device.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As may be used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
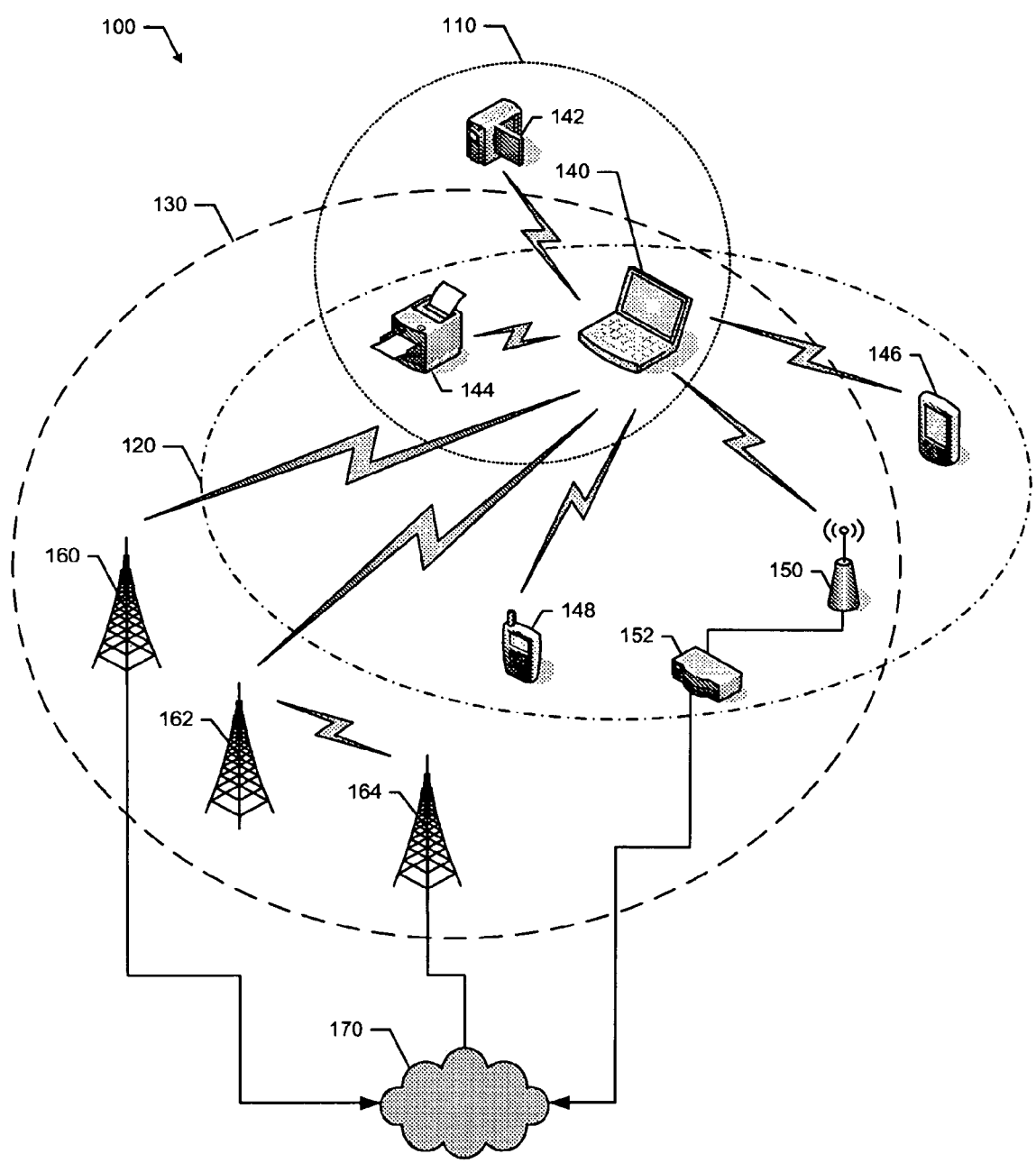
FIG. 1 is a schematic diagram illustrating an example wireless communication environment, in accordance with various embodiments.

Referring now to FIG. 1, an example wireless communication environment 100, in accordance with various embodiments, is illustrated. Wireless communication environment 100 may include one or more wireless communication networks, such as wireless personal area network (WPAN) 110, wireless local area network (WLAN) 120, and wireless metropolitan area network (WMAN) 130. Although FIG. 1 depicts three wireless communication networks, wireless communication environment 100 may include additional or fewer wireless communication networks. For example, wireless communication environment 100 may include additional WPANs, WLANs, and/or WMANs.

Wireless communication environment 100 may also include one or more user devices, generally shown as 140, 142, 144, 146, and 148. As will be described in more detail below, one or more user devices 140, 142, 144, 146, and 148 may be incorporated with the teachings of the present disclosure to estimate their locations based on adjusted distance values. User devices 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five user devices, wireless communication environment 100 may include more or fewer user devices.

User devices 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, laptop computer 140 may operate in accordance with suitable wireless communication protocols that require very low power such as Bluetooth®, ultra-wide band (UWB), and/or radio frequency identification (RFID) to implement WPAN 110. In particular, laptop computer 140 may communicate with devices associated with WPAN 110, such as video camera 142 and/or printer 144, via wireless links.

In another example, laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, laptop computer 140 may communicate with devices associated with WLAN 120 such as printer 144, handheld computer 146 and/or smart phone 148 via wireless links. Laptop computer 140 may also communicate with access point (AP) 150 via a wireless link. AP 150 may be operatively coupled to router 152. Alternatively, AP 150 and router 152 may be integrated into a single device (e.g., a wireless router). Similar to the user devices, AP 150 and/or router 152 may be incorporated with the teachings of the present disclosure to estimate their locations based on adjusted distance values.

Laptop computer 140 may use OFDM modulation to transmit large amounts of digital data by splitting a radio frequency signal into multiple small sub-signals, which in turn, are transmitted simultaneously at different frequencies. In particular, laptop computer 140 may use OFDM modulation to implement WMAN 130. For example, laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s). Base stations 160, 162 and 164 may likewise be incorporated with the teachings of the present disclosure to estimate their locations based on adjusted distance values.

Although some of the above examples are described above with respect to standards developed by IEEE, the present disclosure is readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.).

WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, WLAN 120 may be operatively coupled to common public or private network 170 via AP 150 and/or router 152. In another example, WMAN 130 may be operatively coupled to common public or private network 170 via base station(s) 160, 162, and/or 164.

Wireless communication environment 100 may include other suitable wireless communication networks. For example, wireless communication environment 100 may include a wireless wide area network (WWAN) (not shown). Laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Third Generation Partnership Project (3GPP) technology, standards based on these technologies, variations and evolutions of these standards, and/or other suitable wireless communication standards. Although FIG. 1 depicts a WPAN, a WLAN, and a WMAN, wireless communication system 100 may include other combinations of WPANs, WLANs, WMANs, and/or WWANs.

Wireless communication environment 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system.

Figure 2:
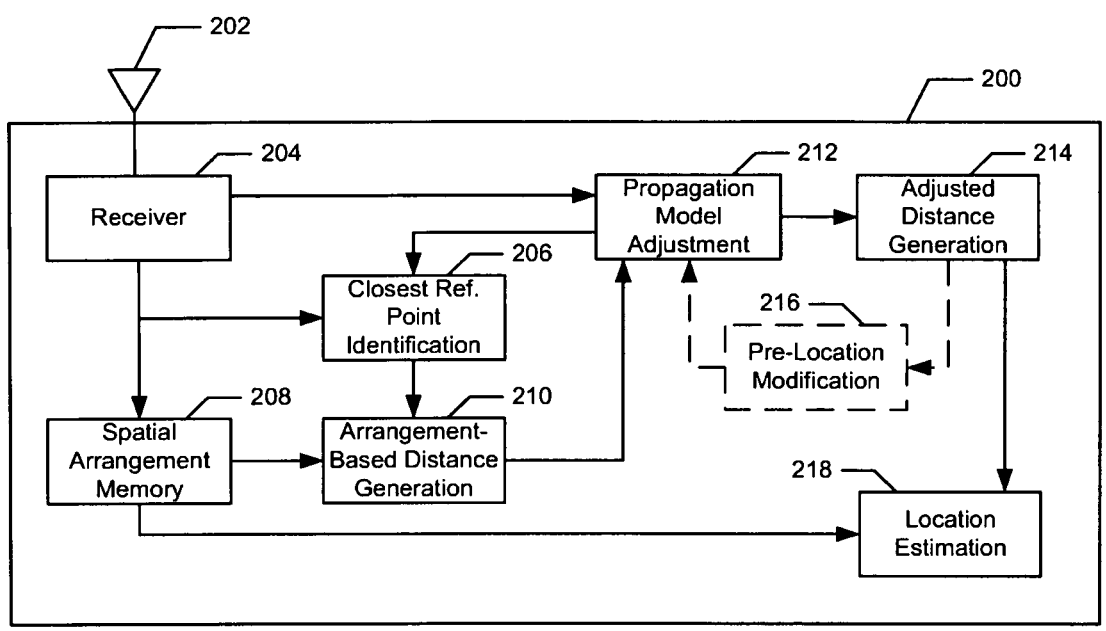
FIG. 2 is a block diagram illustrating an example wireless device, in accordance with various embodiments.

Referring now to FIG. 2, an example wireless device 200 is illustrated, in accordance with various embodiments. The components of wireless device 200, discussed in detail below, may be included in any one or more of the devices discussed above with reference to FIG. 1, including any of user devices 140, 142, 144, 146, and 148, AP 150, router 152, base stations 160, 162, and 164, or any other suitable wireless device. In some embodiments, wireless device 200 is a mobile wireless device, such as a PDA, cellular telephone, tablet computer or laptop computer.

Wireless device 200 may include antenna 202. Antenna 202 may include one or more directional or omni-directional antennas such as dipole antennas, monopole antennas, patch antennas, loop antennas, microstrip antennas, and/or other types of antennas suitable for reception of radio frequency (RF) or other wireless communication signals. Although FIG. 2 depicts a single antenna, wireless device 200 may include additional antennas.

Antenna 202 may be coupled to receiver module 204. Receiver module 204 may be configured for receiving wireless signals transmitted from other wireless devices, such as any of the devices discussed above with reference to FIG. 1. In some embodiments, antenna 202 may also be suitable for transmission of wireless communications signals to one or more reference points, and may be coupled to a transmission module of wireless device 200 (not shown). In some embodiments, receiver module 204 is configured for receiving and distinguishing between wireless signals transmitted from one or more reference points in a wireless communication environment (such as wireless communication environment 100 of FIG. 1). As used herein, a "reference point" may refer to a source of wireless signals that is part of a spatial arrangement of other wireless signal sources whose locations are known or partially known. As used herein, "location" may refer to an absolute location (e.g., a geodetic location) or a relative location (e.g., relative to other reference points or to non-reference point landmarks, such as building boundaries). In some embodiments, a reference point includes an access point (such as AP 150 of FIG. 1).

Receiver module 204 may be configured to extract information from a wireless signal received from a reference point. In some embodiments, this information may include information about the reference point itself, including the location of the reference point, the signal strength at which the reference point transmits wireless signals, a time at which transmission of a wireless signal was initiated, or an identifier of the reference point (e.g., a device name or number), among others. In some embodiments, this information is communicated in a frame transmitted in the wireless signals (e.g., a WiFi beacon frame). In some embodiments, receiver module 204 may be configured to measure characteristics of a received wireless signal, such as a received signal strength (RSS) of a wireless signal, a time at which a wireless signal was received, a bearing from which a wireless signal was received, and/or other types of information about a received wireless signal.

Information about the spatial arrangement of reference points that are or may potentially be in communication with wireless device 200 (e.g., reference points located in the same building as wireless device 200, or located within a given proximity) may be stored in spatial arrangement memory 208. In some embodiments, a spatial data set that includes data representative of the spatial arrangement of reference points is wireless downloaded to spatial arrangement memory 208 from a wireless information source. Such a download may occur automatically when, for example, wireless device 200 first enters a building that contains reference points, or when a user of wireless device 200 first logs on to a website containing information about the spatial arrangement of reference points in a particular area. In some embodiments, a spatial data set is downloaded or entered into wireless device 200 manually. In some embodiments, the spatial data set may include geodetic location data, such as latitude and longitude coordinates or coordinates in another coordinate system (e.g., with reference to one or more other reference points). In some embodiments, the spatial data set may include relative location data (e.g., representative of distances and/or angles between different reference points within some coordinate system). In some embodiments, the data representative of the spatial arrangement may include data representative of the floor in a building on which different reference points are located. In some embodiments, a spatial data set includes data representative of boundaries of a building in which the reference points are located. As discussed above, in some embodiments, receiver 204 extracts at least a portion of a spatial data set from one or more reference point frames transmitted by one or more of the plurality of reference points (e.g., one or more WiFi beacon frames).

Wireless device 200 may include closest reference point identification module 206. Closest reference point identification module 206 may be configured for identifying, from among multiple reference points in wireless communication with receiver module 204, which one or more reference points are closest to wireless device 200. In some embodiments, closest reference point identification module 206 identifies the closest one or more reference points based on information about the wireless signals received from the reference points (via receiver module 204), such as information included in the wireless signal by the reference point or measured characteristics of the wireless signal. In some embodiments, closest reference point identification module 206 identifies the closest one or more reference points using information about the received wireless signals and a propagation model. As used herein, a "propagation model" may include one or more computational relationships between one or more characteristics of a wireless signal transmitted from a source to a receiver. Examples of propagation models that may be suitable for use with the present disclosure include, but are not limited to, models for outdoor propagation (such as ground wave, sky wave, foliage, terrain, rain attenuation and city propagation models), models for indoor propagation (such as path loss and two-ray models), and hybrid indoor-outdoor models.

Wireless device 200 may include arrangement-based distance generation module 210. Arrangement-based distance generation module 210 may be configured for generating, for each reference point, an arrangement-based distance value. An arrangement-based distance value may be representative of the distance between wireless device 200 and the reference point. In some embodiments, arrangement-based distance generation module 210 generates a distance value using information about the closest reference point identified by closest reference point identification module 206 and the spatial arrangement of the recognized reference points stored in spatial arrangement memory 208.

Wireless device 200 may include propagation model adjustment module 212. Propagation model adjustment module 212 may receive information about received wireless signals from receiver module 204 and information about one or more arrangement-based distance values from arrangement-based distance generation module 210, and may be configured for adjusting a propagation model in response. As illustrated in FIG. 2, in some embodiments, information about the adjusted propagation model of propagation model adjustment module 212 may be provided to closest reference point identification module 206, which may repeat a closest reference point identification process using the adjusted propagation model. This feedback between propagation model adjustment module 212 and closest reference point identification module 206 may be iterated, for example, a predetermined number of times or until a desired result is achieved, as discussed in additional detail below.

Wireless device 200 may include adjusted distance generation module 214. Adjusted distance generation module 214 may be configured for generating, for each reference point, an adjusted distance value representative of the distance between the reference point and the wireless device based at, least in part on the corresponding wireless signal received by receiver module 204 and the adjusted propagation model of propagation model adjustment module 212.

Wireless device 200 may include a location estimation module 218. Location estimation module 218 may receive information about the spatial arrangement of reference points from spatial arrangement memory 208 and information about one or more adjusted distance values from adjusted distance generation module 214, and may use this information to estimate a location of wireless device 200. In some embodiments, location estimation module 218 implements a trilateration technique, such as the method of circles, the method of triangles, or the method of spheres, among others. In some embodiments, location estimation module 218 implements a multilateration technique.

In some embodiments in which location estimation module 218 implements a trilateration technique, wireless device 200 may include a pre-location-modification module 216. Pre-location modification module 216 may select at least three of the reference points, and modify one or more of the corresponding adjusted distance values when the adjusted distance values describe circles that do not overlap suitably to trilaterate the wireless device with reference to the selected reference points. In some embodiments, pre-location modification module 216 may increase or decrease one or more of the adjusted distance values, and may provide the modified adjusted distance values to location estimation module 218.

Embodiments of the present disclosure may provide some or all of a number of advantages, including computational tractability, limited required knowledge of environmental conditions such as building materials and orientation of the wireless device, adaptability to changes in environmental and other factors that affect the propagation of wireless signals (such as antenna obstruction and movement of the wireless device between rooms, hallways and open spaces), and applicability to different devices with different antenna gains without the need for extensive modification, among others.

Figure 3:
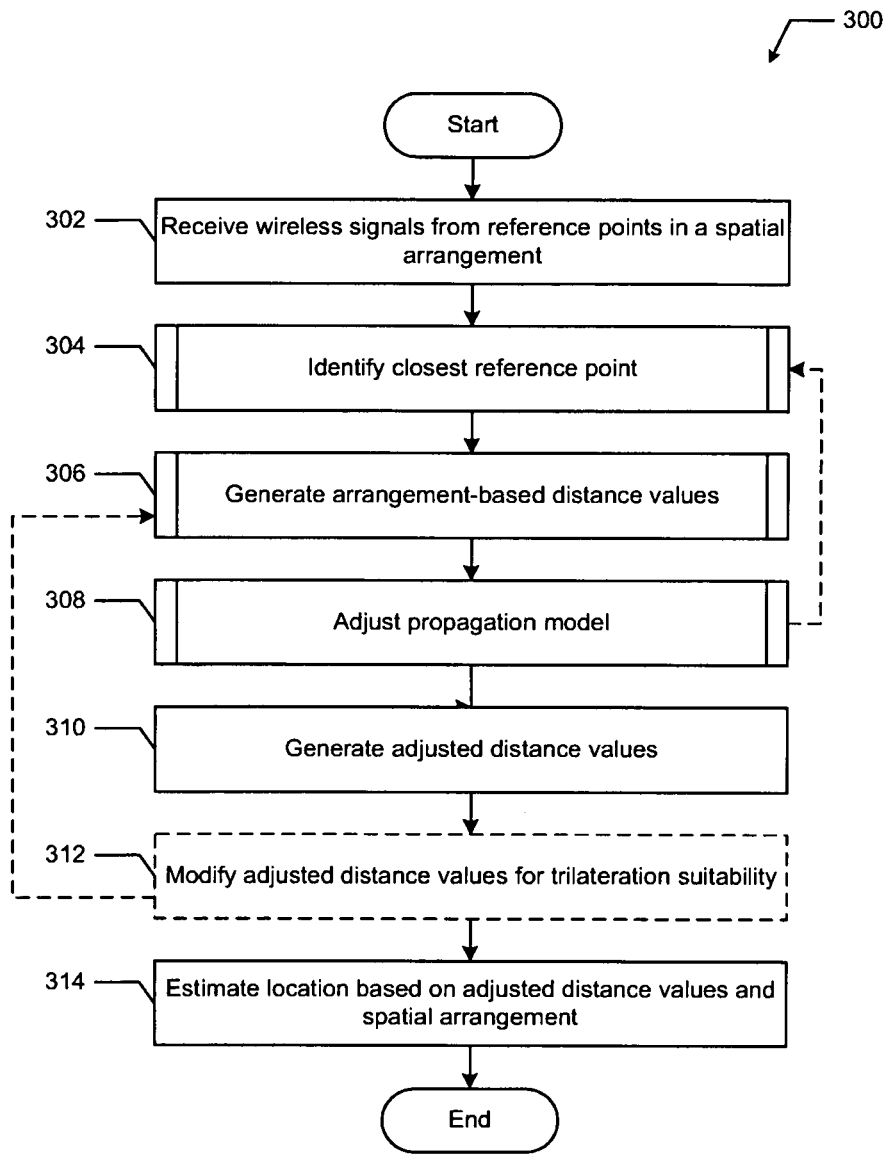
FIG. 3 is a flow diagram of an example location estimation process executable by a wireless device, in accordance with various embodiments.

FIG. 3 is a flow diagram of an example location estimation process 300 executable by a distance-estimating wireless device (such as the wireless device 200 of FIG. 2), in accordance with various embodiments. It may be recognized that, while the operations of process 300 are arranged in a particular order and illustrated once each, in various embodiments, one or more of the operations may be repeated, omitted, or performed out of order. For illustrative purposes, operations of the process 300 and other processes described herein may be described as performed by wireless device 200 (FIG. 2), any suitably configured device (e.g., a programmed processing system, an ASIC, or another wireless computing device) may execute process 300.

The process 300 may begin at operation 302, in which wireless device 200 may receive multiple wireless signals. In some embodiments, operation 302 may be performed by processing circuitry included in receiver module 204 (FIG. 2). Each of the multiple wireless signals received at operation 302 may be transmitted from a different reference points in wireless communication with wireless device 200. As discussed above with reference to spatial arrangement memory module 208 of FIG. 2, the spatial arrangement of the reference points may be known or partially known to wireless device 200 or to another device in communication with wireless device 200 (e.g., a server device). Operation 302 may include any of the embodiments described above with reference to spatial arrangement memory module 208 (FIG. 2), including wirelessly downloading a spatial data set including data representative of the spatial arrangement and receiving data representative of a reference point's location from frames of the wireless signal transmitted from the reference point, for example. In some embodiments, wireless device 200 obtains information about the spatial arrangement before or after receiving wireless signals at operation 302.

At operation 304, wireless device 200 may identify a reference point of the plurality of reference points that is closest to wireless device 200, based on the wireless signals received at operation 302 and a propagation model. As discussed above, a propagation model may include one or more computational relationships between one or more characteristics of a wireless signal transmitted from a source to a receiver. In some embodiments, operation 304 may be performed by processing circuitry included in closest reference point identification module 206 (FIG. 2). Particular embodiments of operation 304 are described below with reference to process 400 of FIG. 4.

At operation 306, wireless device 200 may generate, for each reference point, an arrangement-based distance value. As discussed, an arrangement-based distance value may be representative of the distance between wireless device 200 and the reference point, based at least in part on the closest reference point identified at operation 304 and the spatial arrangement of reference points. In some embodiments, operation 306 may be performed by processing circuitry included in arrangement-based distance generation module 210 (FIG. 2). Particular embodiments of operation 306 are described below with reference to processes 500, 600 and 900 of FIGS. 5, 6 and 9, respectively.

At operation 308, wireless device 200 may adjust the propagation model (discussed above with reference to operation 304) based at least in part on one or more of the wireless signals received at operation 302 and one or more of the arrangement-based distance values generated at operation 306. In some embodiments, operation 308 may be performed by processing circuitry included in propagation model adjustment module 212 (FIG. 2). Particular embodiments of operation 308 are described below with reference to processes 1000, 1100 and 1200 of FIGS. 10, 11 and 12, respectively. In some embodiments, wireless device 200 may iterate operations 304-308 by re-identifying the closest reference point at operation 304 using the adjusted propagation model generated at operation 308. The loop of operations 304-308 may be may be iterated, for example, a predetermined number of times or until a desired result is achieved. For example, the loop may be iterated until the adjustments to the propagation model at operation 308 fall below an absolute or relative threshold. Not all of the intervening operations between operations 304 and 308 need be repeated during iterations of the loop. In some embodiments, when the closest reference point identified at a particular iteration of operation 304 is the same as the closest reference point identified at an earlier iteration, wireless device 200 may not repeat operation 306, and may instead retrieve previously generated arrangement-based distance values from a cache or other memory. In some embodiments, the adjustment of the propagation model at operation 308 allows wireless device 200 to reconcile discrepancies between predictions of the propagation model based on the wireless signals received at operation 302 and the arrangement-based distance values generated at operation 308. In particular, the adjustment of the propagation model at operation 308 may update the propagation model to reflect changes in the environment of wireless device 200 that affect wireless signal propagation, and thereby improve the accuracy of the propagation model.

At operation 310, wireless device 200 may generate, for each of the reference points, an adjusted distance value. An adjusted distance value generated at operation 310 may be representative of the distance between the reference point and the wireless device based at least in part on the wireless signal received from the reference point at operation 302 and the adjusted propagation model resulting from operation 308. In some embodiments, operation 310 may be performed by processing circuitry included in adjusted distance generation module 214 (FIG. 2). In some embodiments, operation 310 may be performed by evaluating the adjusted propagation model using information about the received wireless signal to generate a distance value consistent with the relationships between the received wireless signal information and distance values represented by the adjusted propagation model. Particular embodiments of operation 308 are described below with reference to processes 1000, 1100 and 1200 of FIGS. 10, 11 and 12, respectively.

At optional operation 312, wireless device 200 may modify the adjusted distance values generated at operation 310 prior to proceeding to estimate a location of wireless device 200 at operation 314. In particular, when the location estimation of operation 314 involves a trilateration technique, a multilateration technique, or any other location technique that involves necessary conditions on distance values in order to generate allocation estimate, wireless device 210 may modify the adjusted distance values generated at operation 310 in order to achieve the necessary conditions. For example, in some embodiments, in order to generate a unique location estimate using a trilateration technique that involves a method of circles, at least three reference points should be selected and the adjusted distance values corresponding to the selected reference points should describe circles that have one or more points of intersection. When the adjusted distance values generated at operation 310 do not yield distances that describe suitably intersecting circles, wireless device 200 may increase or decrease one or more of the adjusted distance values corresponding to the selected reference points until any necessary conditions for trilateration are achieved. In some embodiments, wireless device 200 may provide the modified adjusted distance values to propagation model adjustment module 212 for further adjustment of the propagation model. In some embodiments, operation 312 may be performed by processing circuitry included in pre-location modification module 216 (FIG. 2). Particular embodiments of operation 312 are described below with reference to process 1300 of FIG. 13.

At operation 314, wireless device 200 may estimate the location of the wireless device based on the spatial arrangement of the reference points and the adjusted distance values generated at operation 310 (and optionally modified at operation 312). Process 300 may then end.

Wireless device 200 may execute any one or more location techniques using the spatial arrangement and the adjusted distance values at operation 314. Suitable location techniques may include two- or three-dimensional trilateration techniques, two- or three-dimensional multilateration techniques, and other techniques. In some embodiments, operation 314 may include executing a trilateration technique based on a method of circles. For example, in some embodiments of a two-dimensional method of circles technique, the spatial arrangement of N reference points may be described by a spatial data set that includes an x-y coordinate $\{x_i, y_i\}$ for each reference point $RP_i$. Each reference point $RP_i$ may also correspond to an adjusted distance value $d_i$ (generated at operation 310, as discussed above). In such an embodiment, wireless device 200 may estimate its location at operation 314 by determining one or more values $\{x,y\}$ that satisfy or approximately satisfy the following set of N constraints:

$$d_i^2 = (x-x_i)^2 + (y-y_i)^2, i=1,\ldots,N \qquad (1)$$

Depending upon the x-y coordinates $\{x_i, y_i\}$, the adjusted distance values $d_i$, and the number of reference points N, the set of constraints represented by Eq. (1) may be satisfied by one, none, or multiple values $\{x,y\}$. When no values $\{x,y\}$ satisfy the set of constraints of Eq. (1), wireless device 200 may perform operation 312 and perform a pre-location modification of the adjusted distance values to modify one or more of the adjusted distance values corresponding to the reference points until the distahce values and the locations of the reference points describe circles that overlap suitably to trilaterate the wireless device in accordance with the above set of constraints. Particular embodiments of operation 312 are described below with reference to process 1300 of FIG. 13. When multiple values $\{x,y\}$ satisfy the set of constraints of Eq. (1), in some embodiments, wireless device 200 may perform a pre-location modification of the adjusted distance values until a unique satisfying value $\{xy\}$ is obtained, or may perform an estimation operation such as least-square error estimation to select a unique satisfying value $\{x,y\}$, or may perform a combination of these operations.

Figure 4:
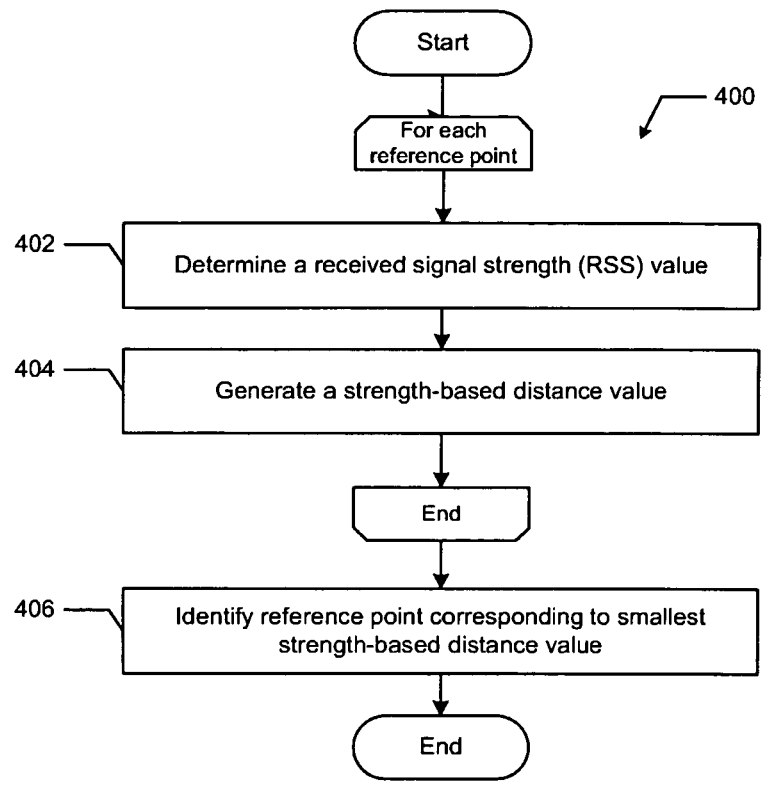
FIG. 4 is a flow diagram of an example closest reference point identification process, in accordance with various embodiments.

Referring now to FIG. 4, a flow diagram is provided of example closest reference point identification process 400, in accordance with various embodiments. As discussed above, closest reference point identification process 400 may be included in operation 304 of process 300 (FIG. 3). In some embodiments, closest reference point identification process 400 identifies a reference point among multiple reference points that is closek to wireless device 200 based on the wireless signals received from the multiple reference points (e.g., at operation 302 of FIG. 3) and a propagation model. As illustrated in FIG. 4, operations 402 and 404 may be performed for each of the multiple referetnce points.

At operation 402, wireless device 200 may determine, for a given reference point and corresponding received wireless signal, a received signal strength value. In some embodiments, a received signal strength value is representative of the power present in a received wireless signal. A received signal strength value may be measured in any suitable units, such as volts (V), milliwatts (mW), decibels (dB) or a manufacturer- or communication protocol-specific unit. For example, the received signal strength value determined by wireless device 200 at operation 402 may be a received signal strength indicator (RSSI) associated with the IEEE 802.11 communications standard.

At operation 404, wireless device 200 may generate, for a given reference point, a strength-based distance value. In some embodiments, a strength-based distance value may be representative of a distance between the given reference point and wireless device 200 and may be determined based at least in part on the corresponding received signal strength value (determined at operation 402) and the propagation model. In some embodiments, a propagation model includes computational relationships between the signal strength values of a wireless signals received at wireless device 200 and the distance between the transmitting reference point and wireless device 200. Thus, at operation 404, wireless device 200 may apply information about the received signal strength value of a wireless signal to the propagation model to determine the distance between wireless device 200 and the reference point that transmitted the wireless signal.

As discussed above with reference to closest reference point identification module 206 (FIG. 2), any of a number of propagation models may be used at operation 404. For example, in some embodiments, the propagation model of operation 404 includes a path loss model. In some embodiments, the path loss model may take the following form:

$$L = dBt - dBr = 20\log_{10}\left(\frac{4\pi d}{\lambda}\right), \quad (2)$$

wherein the parameter L represents the path loss, the parameter dBt represents the signal strength with which the reference point transmits the wireless signal (expressed in decibels), the parameter dBr represents the signal strength of the wireless signal received at wireless device 200 (expressed in decibels), the parameter d represents the distance between the reference signal and wireless device 200, and the parameter λ represents the wavelength of the wireless signal (expressed in the same units as the distance d). In some embodiments, wireless device 200 may receive information about the parameter dBt along with the wireless signal from the reference point (e.g., in a frame of data transmitted from the reference point). In some embodiments, wireless device 200 may receive information about the parameter dBt from another data source (e.g., from a source of spatial arrangement data and downloaded to wireless device 200). In some embodiments, information about the parameters dBt and λ for a given reference point may be stored in a memory accessible to wireless device 200, and may be retrieved during execution of operation 404.

If wireless device 200 utilizes the propagation model of Eq. (2) at operation 404, wireless device 200 may generate a strength-based distance value by applying dBr (the received signal strength value determined at operation 402), along with dBt and λ (which, as discussed above, may be previously stored and retrieved), to the propagation model of Eq. (2). The result of applying this information to the propagation model of Eq. 2 is a unique value of d that satisfies the propagation model, which wireless device 200 may use as the strength-based distance value generated at operation 404. As discussed above, wireless device 200 may use any of a number of other propagation models instead of or in addition to the path loss propagation model of Eq. (2); the path loss propagation model is discussed in detail here for the purpose of illustration.

As indicated in FIG. 4, operations 402 and 404 may be repeated for each reference point from which wireless device 200 receives a wireless signal. Once a strength-based distance value has been generated for each reference point, wireless device 200 may proceed to operation 406 and identify the reference point that corresponds to the smallest strength-based distance value. This reference point may then serve as the closest reference point discussed above with reference to operation 304 of FIG. 3. Process 400 may then end.

Figure 5:
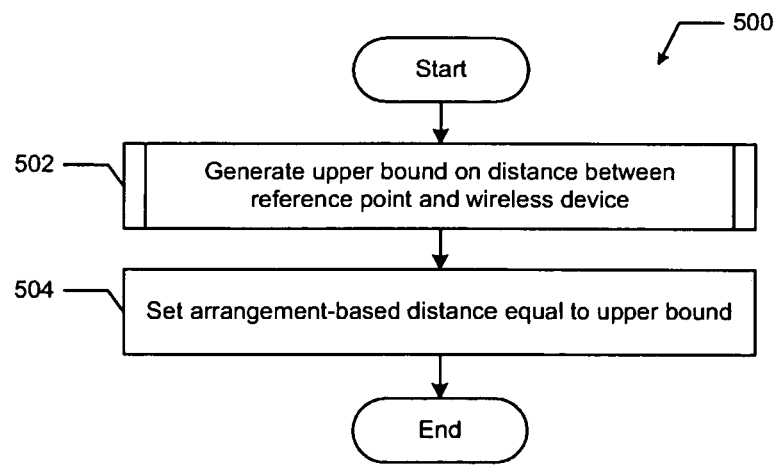
FIG. 5 is a flow diagram of an example arrangement-based distance generation process, in accordance with various embodiments.

Referring now to FIG. 5, a flow diagram is provided of example arrangement-based distance generation process 500, in accordance with various embodiments. As discussed above, arrangement-based distance generation process 500 may be included in operation 306 of process 300 (FIG. 3). In some embodiments, arrangement-based distance generation process 500 is executed for each reference point in wireless communication with wireless device 200 and generates, for each reference point, an arrangement-based distance value representative of the distance between wireless device 200 and the reference point based at least in part on the closest reference point identified at operation 304 (FIG. 3) and the spatial arrangement of reference points. At operation 502, wireless device 200 may generate an upper bound on the distance between a particular reference point and wireless device 200 based on the spatial arrangement of the reference points and the closest reference point identified at operation 304 (FIG. 3). In some embodiments, wireless device 200 may be known or suspected to be in motion. In such embodiments, wireless device 200 may perform operation 502 by summing the distance between the closest reference point and a location of the wireless device at a previous time (e.g., the location estimated by a previous execution of process 300 of FIG. 3) and a distance traveled by the wireless device since the previous time (calculated, e.g., by multiplying the speed of wireless device 200 by the elapsed time). In some embodiments, wireless device 200 may add an error value to this sum to reflect error in the estimation or measurement of one or more of location, time and speed. Additional embodiments of operation 502, which may be used singly or in combination, are described below with reference to processes 600 and 900 of FIGS. 6 and 9, respectively. At operation 504, wireless device 200 sets the arrangement-based distance value for the particular reference point equal to the upper bound generated at operation 502. Process 500 may then end.

Figure 6:
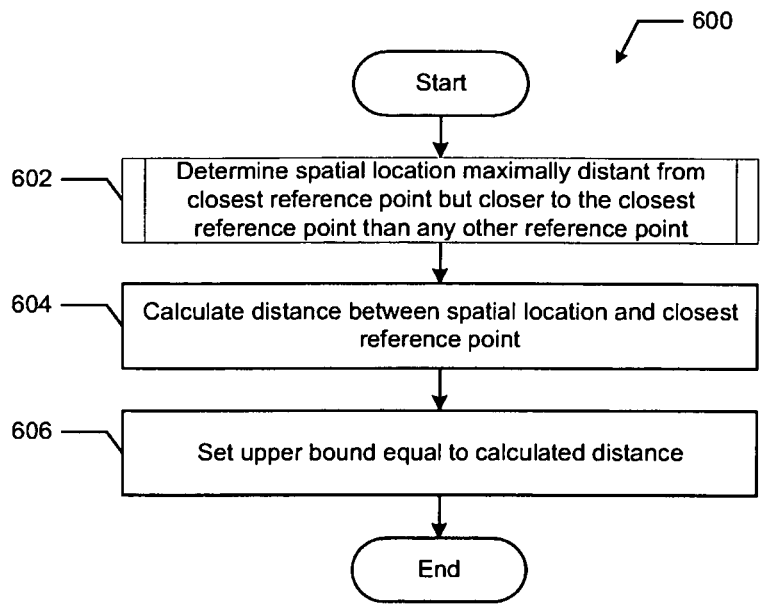
FIG. 6 is a flow diagram of an example process for generating an upper bound on a distance between a closest reference point and a wireless device, in accordance with various embodiments.

Referring now to FIG. 6, a flow diagram is provided of example process 600 for generating an upper bound on a distance between a closest reference point (e.g., as identified at operation 304 of FIG. 3) and wireless device 200, in accordance with various embodiments. As discussed above, process 600 may be included in operation 502 of process 500 (FIG. 5). At operation 602, wireless device 200 may determine a spatial location that is maximally distant from the closest reference point (e.g., as identified at operation 304 of FIG. 3) but closer to the closest reference point than to any other reference point according to the spatial arrangement. Several embodiments of operation 602 are described below with reference to process 700 of FIG. 7 and illustrated in FIG. 8. At operation 604, wireless device 200 may calculate a distance between the spatial location determined at operation 602 and the closest reference point. At operation 606, wireless device 200 may set the upper bound on the distance between the closest reference point and wireless device 200 equal to the distance calculated at operation 604. Process 600 may then end.

Figure 7:
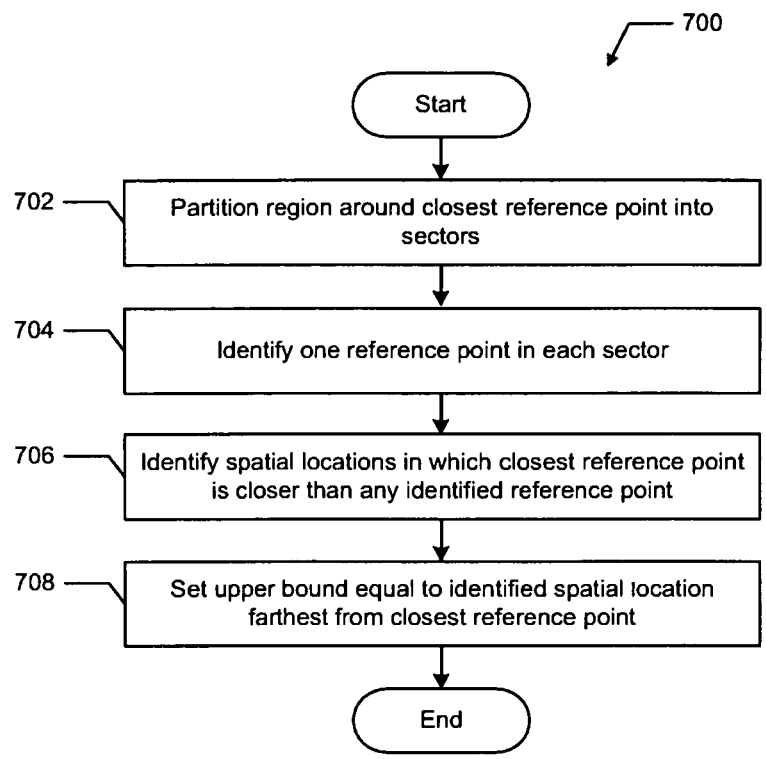
FIG. 7 is a flow diagram of an example process for generating an upper bound on a distance between a closest reference point and a wireless device by partitioning the region around the closest reference point into sectors, in accordance with various embodiments.

Referring now to FIG. 7, a flow diagram is provided of an example process for generating an upper bound on a distance between a closest reference point and wireless device 200 by partitioning the region around the closest reference point into sectors, in accordance with various embodiments. As discussed above, process 700 may be included in operation 602 of process 600 (FIG. 6). At operation 702, wireless device 200 partitions a region around the closest reference point (e.g., as identified at operation 304 of FIG. 3) into two or more sectors. In some embodiments, the sectors may be defined by angular regions around the closest reference point. For example, the sectors may be quadrants around the closest reference point. The sectors may be equally or unequally sized, and regularly or irregularly spaced. In some embodiments, wireless device 200 may partition the region based on the location of reference points according to the spatial arrangement, or may partition the region independently of the location of reference points.

At operation 704, wireless device 200 identifies one reference point in each of the sectors into which the region around the closest reference point was partitioned at operation 702. At operation 706, wireless device 200 identifies one or more spatial locations in which the closest reference point (identified at operation 304 of FIG. 3) is closer than any reference point among the reference points identified at operation 704. In some embodiments, the result of operation 706 may be a spatial region, all of whose points are closer to the closest reference point than any identified reference point. At operation 708, wireless device 200 sets the upper bound on a distance between the closest reference point and wireless device 200 equal to the distance between the closest reference point and the spatial location identified at operation 706 that is farthest from the closest reference point. In some embodiments, the distance to which the upper bound is set at operation 708 is the farthest point from the closest reference point that is still closer to the closest reference point than to any other reference point. Process 700 may then end.

In some embodiments, if more than one reference point is present in a particular sector, wireless device 200 may select the one reference point whose distance to the closest reference point (identified at operation 304 of FIG. 3) is smallest, or may use another technique to select the one reference point (e.g., at random or based on an index of the reference point in a list of reference points). In some embodiments, if no reference point is present in a particular sector, wireless device 200 may identify a boundary of a building in which the closest reference point is located and use that boundary as a boundary on the spatial region of points that are closer to the closest reference point than any identified reference point. By using a building or other known physical boundary to bound the region in which wireless device 200 may be located, process 700 may more accurately upper bound the distance between the closest reference point and wireless device 200.

Figure 8:
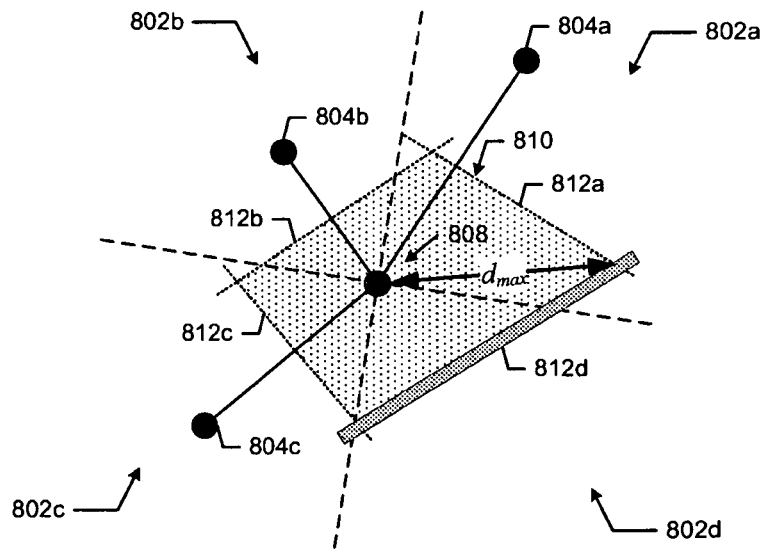
FIG. 8 is an illustration of the upper bound generation process of FIG. 7 using reference points and a building boundary in a known spatial arrangement, in accordance with various embodiments.

FIG. 8 is an illustration of upper bound generation process 700 of FIG. 7 using reference points and a building boundary in a known spatial arrangement, in accordance with various embodiments. FIG. 8 represents a scenario in which reference point 808 has been identified as the closest reference point to wireless device 200 (e.g., at operation 304 of FIG. 3). The region around closest reference point 808 is partitioned into four sectors 802a-802d (in accordance with operation 702 of FIG. 7). In each of sectors 802a, 802b and 802c, a reference point has been identified in accordance with operation 704 of FIG. 7; namely, reference points 804a, 804b and 804c, respectively. Region boundaries 812a, 812b and 812c, if extended indefinitely, indicate the boundary between spatial locations that are closer to closest reference point 808 than to reference points 804a, 804b and 804c, respectively, in accordance with operation 706 of FIG. 7. In FIG. 8, the spatial locations that are closer to closest reference point 808 are shaded. No reference point is located in sector 802d and thus, in some embodiments, wireless device 200 may use building boundary 812d as a boundary on the shaded region of spatial locations. FIG. 8 also illustrates the distance $d_{max}$ between closest reference point 808 and the boundary of the shaded region, which represents an upper bound on the distance between closest reference point 808 and wireless device 200, in accordance with operation 708 of FIG. 7.

Figure 9:
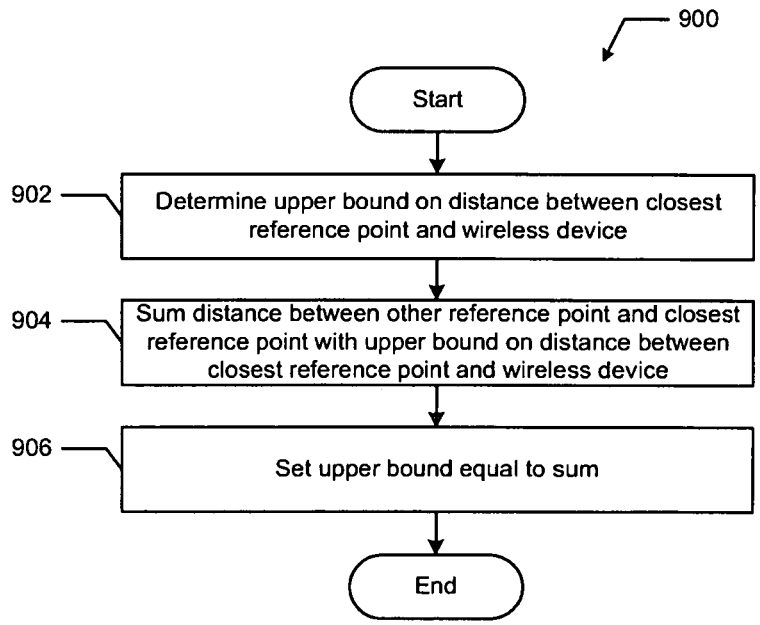
FIG. 9 is a flow diagram of an example process for generating an upper bound on a distance between a non-closest reference point and a wireless device, in accordance with various embodiments.

Referring now to FIG. 9, a flow diagram is provided of an example process 900 for generating an upper bound on a distance between a non-closest reference point and wireless device 200, in accordance with various embodiments. As discussed above, process 900 may be included in operation 502 of process 500 (FIG. 5). In some embodiments, process 900 is executed for each reference point in wireless communication with wireless device 200 other than the closest reference point (e.g., as identified at operation 304 of FIG. 3). At operation 902, wireless device 200 may determine an upper bound on the distance between the closest reference point (e.g., identified at operation 304 of FIG. 3) and wireless device 200. A number of embodiments of processes for performing operation 902 are described herein, including process 700 of FIG. 7. Wireless device 200 need not repeat operation 902 if an upper bound on the distance between the closest reference point and wireless device 200 has previously been determined, and may instead retrieve the upper bound value from a cache or other memory. At operation 904, wireless device 200 may sum the upper bound on the distance between the closest reference point and wireless device 200 (as determined at operation 902) and a distance between the closest reference point and a particular reference point for which process 900 is being performed. Wireless device 200 may determine the distance between the closest reference point and the particular reference point based on data representative of the spatial arrangement of reference points (e.g., as stored in spatial arrangement memory module 208 of FIG. 2). At operation 906, wireless device 200 may set the upper bound on the distance between the particular reference point and wireless device 200 equal to the sum generated at operation 904. Process 900 may then end.

Figure 10:
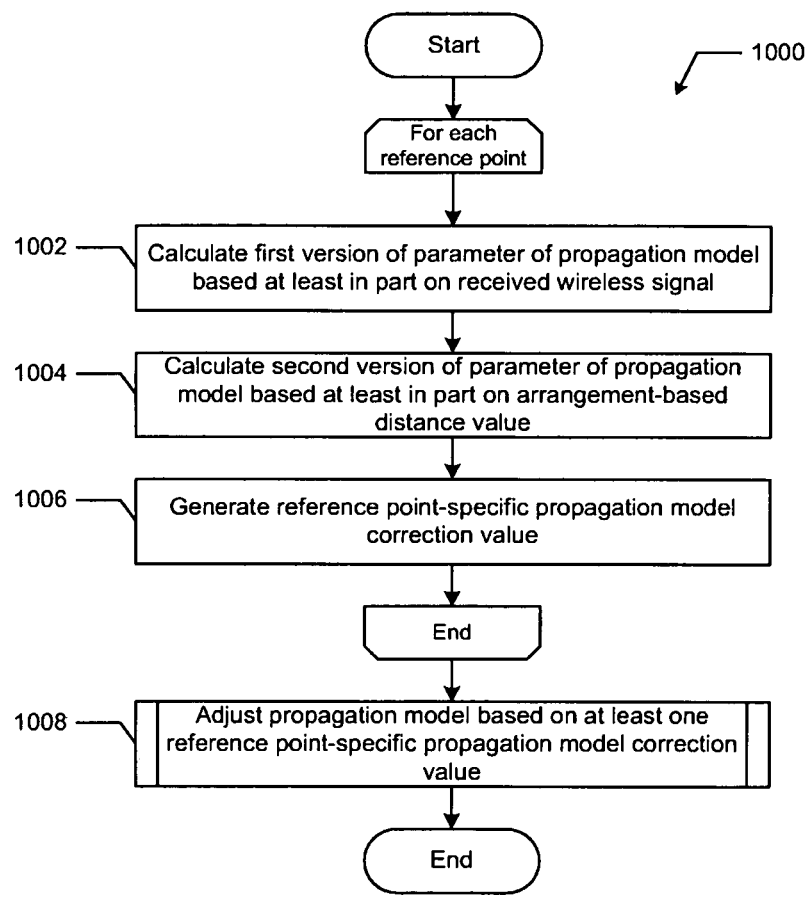
FIG. 10 is a flow diagram of an example propagation model adjustment process, in accordance with various embodiments.

Referring now to FIG. 10, a flow diagram is provided of example propagation model adjustment process 1000, in accordance with various embodiments. As discussed above, propagation model adjustment process 1000 may be included in operation 308 of process 300 (FIG. 3). In some embodiments, propagation model adjustment process 1000 may adjust the propagation model based at least in part on one or more of the wireless signals received at operation 302 of FIG. 3 and one or more of the arrangement-based distance values generated at operation 306 of FIG. 3. As discussed above with reference to operation 308 (FIG. 3), in some embodiments, the adjustment of the propagation model via process 1000 may update the propagation model to reflect changes in the environment of wireless device 200 that affect wireless signal propagation, and thereby improve the accuracy of the propagation model.

As illustrated in FIG. 10, operations 1002-1006 may be performed for each of the reference points. At operation 1002, wireless device 200 may calculate a first version of a parameter of the propagation model based at least in part on the wireless signal received from the reference point at operation 302 of FIG. 3. At operation 1004, wireless device 200 may calculate a second version of the parameter of the propagation model based at least in part on the arrangement-based distance value for the reference point, as generated at operation 306 of FIG. 3. At operation 1006, wireless device 200 may generate a reference point-specific propagation model correction value based at least in part on the first and second versions of the parameter calculated at operations 1002 and 1004, respectively. At operation 1008, wireless device 200 may adjust the propagation model based at least in part on one or more of the reference point-specific propagation model correction values generated at operation 1006. Particular embodiments of operation 1008 are described below with reference to process 1100 of FIG. 11. Process 1000 may then end.

In some embodiments of propagation model adjustment process 1000, the propagation model includes a path loss model and the parameter calculated at operations 1002 and 1004 is a path loss. An example of a path loss model is given above as Eq. (2). In some such embodiments, at operation 1002, wireless device 200 may calculate a first version $L_{i,1}$ of the path loss based on the wireless signal received from reference point $RP_i$ at operation 302 of FIG. 3 by comparing, for example, a received signal strength of the wireless signal to a transmitted signal strength of the wireless signal. The difference between the received and transmitted signal strength may represent the path loss. At operation 1004, wireless device 200 may calculate a second version $L_{i,2}$ of the path loss by applying the arrangement-based distance value (generated at operation 306 of FIG. 3) to the path loss model (e.g., the right-hand side of Eq. (2)) and identifying the path loss predicted by the path loss model. At operation 1006, wireless device 200 may generate a reference point-specific propagation model correction value $CV_i$ using the first and second path losses by, for example, identifying an additive factor $CV_i$ such that:

$$L_{i,1} = L_{i,2} - CV_i \quad (3)$$

A reference point-specific propagation model correction value need not be an additive adjustment to a propagation model. In some embodiments, a reference point-specific propagation model correction value may be a multiplicative value, an exponential value, a combination of values, a parameter of a linear or non-linear function, or any other one or more values that, when adjusted, adjust the propagation model.

Figure 11:
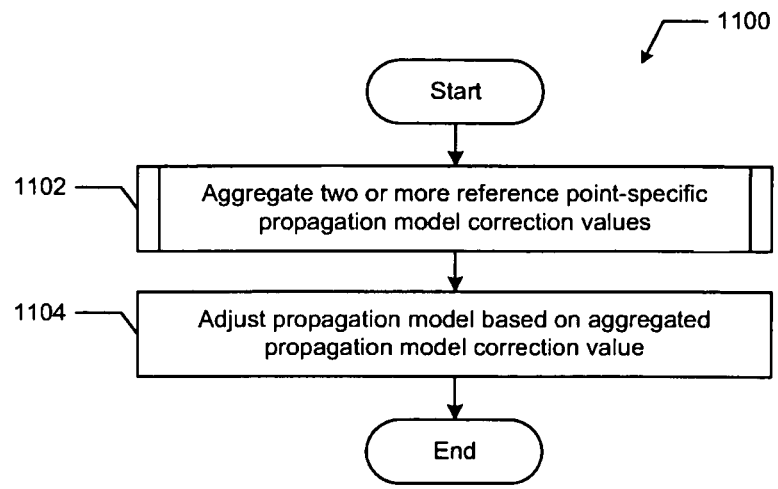
FIG. 11 is a flow diagram of an example propagation model adjustment sub-process, in accordance with various embodiments.

Turning to FIG. 11, a flow diagram is provided of an example propagation model adjustment sub-process 1100, in accordance with various embodiments. As discussed above, propagation model adjustment sub-process 1100 may be included in operation 1008 of process 1000 (FIG. 10). At operation 1102, wireless device 200 may aggregate two or more of the reference point-specific propagation model correction values (e.g., generated at operation 1006 of FIG. 10) into an aggregate propagation model correction value. The aggregation of reference point-specific propagation model correction values at operation 1102 may take the form of a linear function, a non-linear function, or any other computational combination of one or more of the reference point-specific model correction values. In some embodiments, the aggregate propagation model correction value is the minimum value in the set of all of the reference point-specific propagation model correction values. Additional embodiments of operation 1102 are described below with reference to process 1200 of FIG. 12. At operation 1104, wireless device 200 may adjust the propagation model in accordance with operation 308 of FIG. 3 based on the aggregate propagation model correction value generated at operation 1102. Process 1100 may then end.

In some embodiments of propagation model adjustment sub-process 1100, the propagation model includes a path loss model (such as the path loss model of Eq. (2) above). In some such embodiments, at operation 1104, wireless device 200 may adjust the propagation model using an aggregate propagation model correction value CV according to:

$$L = dBt - dBr = 20\log_{10}\left(\frac{4\pi d}{\lambda}\right) - CV, \quad (4)$$

where CV is based on one or more of the reference point-specific model correction values generated at operation 1006 of FIG. 10. An aggregated propagation model correction value need not be an additive adjustment to a propagation model. In some embodiments, an aggregated propagation model correction value may be a multiplicative value, an exponential value, a combination of values, a parameter of a linear or non-linear function, or any other one or more values that, when adjusted, adjust the propagation model. In some embodiments, the form of the aggregated propagation model correction value may be different from the form of one or more of the reference point-specific propagation model correction values (e.g., the aggregated propagation model correction value may be additive and at least one of the reference point-specific propagation model correction values may be multiplicative). In some embodiments, wireless device 200 may determine and use additional correction values to adjust the propagation model at operation 308 of FIG. 3. For example, wireless device 200 may adjust propagation model using two propagation model correction values CV and CV, according to:

$$L = dBt - dBr = 20\log_{10}\left(\frac{4\pi d}{\lambda}\right) - CV - CV_z, \quad (5)$$

where CV may be determined as described above with reference to Eq. (4) with wireless signals from reference points on a same floor of a building as wireless device 200, and $CV_z$ is a correction value determined after CV has been determined, following the same procedures used to generate CV but with wireless signals from reference points on different floors of the building from wireless device 200. In some such embodiments, wireless device 200 may perform operations 302-308 of FIG. 3 using wireless signals from a same floor as wireless device 200 to generate CV, and may perform operations 302-308 of FIG. 3 using wireless signals from different floors as wireless device 200 to generate $CV_z$, before proceeding to generate adjusted distance values at operation 310 (FIG. 3).

Figure 12:
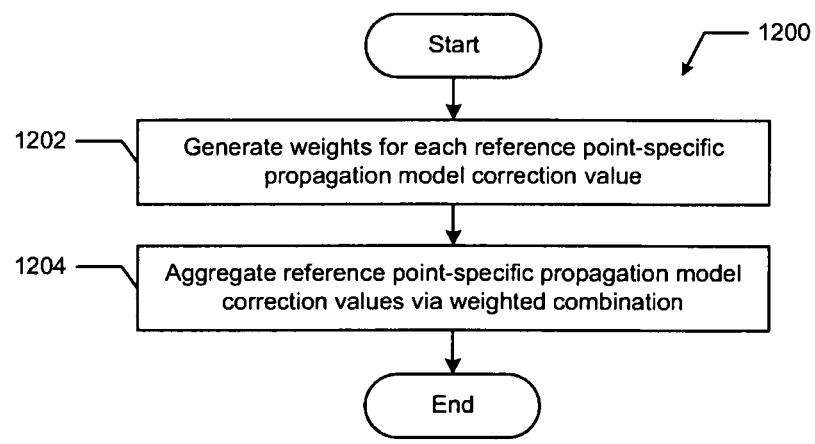
FIG. 12 is a flow diagram of an example propagation model correction value aggregation process, in accordance with various embodiments.

Turning to FIG. 12, a flow diagram is provided of an example propagation model correction value aggregation process 1200, in accordance with various embodiments. As discussed above, propagation model correction value aggregation process 1200 may be included in operation 1102 of process 1100 (FIG. 11). In some embodiments, propagation model correction value aggregation process 1200 may calculate a weighted combination of two or more of the reference point-specific propagation model correction values generated at operation 1006 of FIG. 10, and use the weighted combination as the aggregate propagation model correction value in operation 1104 of FIG. 11. At operation 1202, wireless device 200 may generate weights for one or more of the reference point-specific propagation model correction values generated at operation 1006 of FIG. 10. In some embodiments, wireless device 200 generates a weight associated with a reference point-specific propagation model correction value based at least in part on how close the corresponding reference point is to wireless device 200 based on the wireless signals received at operation 302 of FIG. 3. For example, wireless device 200 may apply a propagation model to the signal strengths of the wireless signals received at operation 302 (FIG. 3) and determine a distance prediction for each of the corresponding reference points based on the propagation model. Wireless device 200 may then rank the reference points in increasing order of their predicted distance from wireless device 200, and generate weights that are inversely proportion to the reference point's rank in the list. For example, in some embodiments, the weight $w_{(i)}$ associated with the $i^{th}$ closest reference point according to the received wireless signals may be given by:

$$\frac{1}{\sum_{i=1}^{N}\left(\frac{1}{r}\right)^{i}}\left(\frac{1}{r}\right)^{i}, \quad (6)$$

where N is the number of reference points and r is a selectable value greater than 1 (e.g., 2). At operation 1204, wireless device 200 may aggregate, the reference point-specific propagation model correction values with a weighted combination using the weights generated at operation 1202. Process 1200 may then end. In some embodiments, the weighted combination of operation 1204 may be a linear combination, and may take the form:

$$CV = \sum_{i=1}^{N} w_i CV_i, \quad (7)$$

where $w_i$ is the weight associated with the $i^{th}$ reference point $RP_i$ and $CV_i$ is the reference point-specific propagation model correction value corresponding to $RP_i$.

Figure 13:
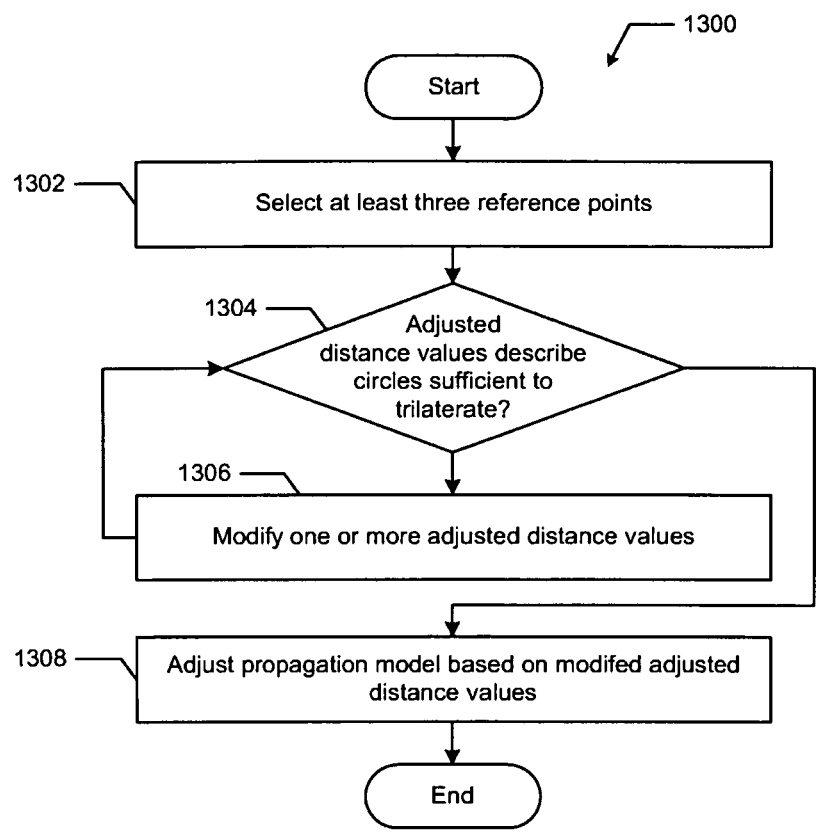
FIG. 13 is a flow diagram of an example pre-location modification process, in accordance with various embodiments.

Turning to FIG. 13, a flow diagram is provided of an example pre-location modification process 1300, in accordance with various embodiments. As discussed above, process 1300 may be included in operation 312 of process 300 (FIG. 3). At operation 1302, wireless device 200 may select at least three reference points. In some embodiments, the at least three reference points selected at operation 1302 may be selected to serve as the reference points for a trilateration technique performed at operation 314 of process 300 (FIG. 3), as discussed above. In some embodiments, the selection of reference points at operation 1302 may be based on one or more criteria, such as signal strength, confidence, proximity to wireless device 200, and spatial distribution around wireless device 200, among others. In some embodiments, the selection of reference points at operation 1302 may be random or pseudo-random. In some embodiments, the selection of reference points at operation 1302 may combine random and non-random selection techniques.

At decision block 1304, wireless device 200 determines whether the adjusted distance values corresponding to the selected reference points (e.g., as generated at operation 310 of FIG. 3) describe circles that overlap suitably to trilaterate wireless device 200. Examples of conditions under which adjusted distance values describe circles that do not overlap suitably are discussed above with reference to operation 312 of FIG. 3. If wireless device 200 determines at decision block 1304 that the adjusted distance values corresponding to the selected reference points describe circles that overlap suitably to trilaterate wireless device 200, wireless device 200 may proceed to perform operation 1308 and may proceed to trilaterate the location of wireless device 200 based on the spatial arrangement of the reference points and the adjusted distance values, as discussed above with reference to FIG. 3.

If wireless device 200 determines at decision block 1304 that the adjusted distance values corresponding to the selected reference points do not describe circles that overlap suitably to trilaterate wireless device 200, wireless device 200 may proceed to perform operation 1306 and may increase and/or decrease one or more of the adjusted distance values. The increase and/or decrease of the adjusted distance values of operation 1306 may continue until the modified adjusted distance values corresponding to the selected reference points describe circles that overlap suitably to trilaterate the wireless device with reference to the selected reference points. Particular embodiments of operation 1306 are discussed below with reference to FIG. 14. In some embodiments, wireless device 200 may then proceed to operation 1306 and may adjust the propagation model based on the modified adjusted distance values in accordance with operation 308 of FIG. 3. Process 1300 may then end.

In some embodiments, wireless device 200 may not proceed to operation 1306 and adjust the propagation model based on one or more of the modified adjusted distance values unless the one or more modified adjusted distance values are larger than the adjusted distance values prior to the modification. In some embodiments, wireless device 200 may not proceed to adjust the propagation model based on the modified adjusted distance values, but may instead proceed to perform an embodiment of operation 314 of FIG. 3 and trilaterate the location of wireless device 200 based on the spatial arrangement of the reference points and the modified adjusted distance values, as discussed above with reference to FIG. 3.

Figure 14:
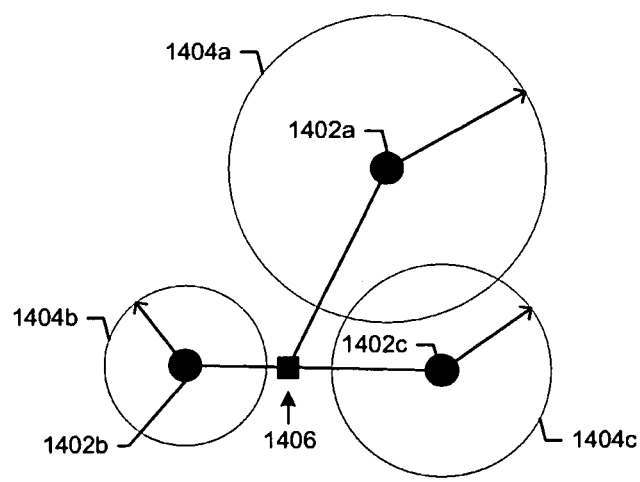
FIG. 14 is an illustration of the pre-location modification process of FIG. 13, in accordance with various embodiments.

FIG. 14 is an illustration of an embodiment of pre-location modification process 1300 of FIG. 13. Three reference points $RP_1$ 1402a, $RP_2$ 1402b and $RP_3$ 1402c are depicted in their spatial arrangement. Circles 1404a, 1404b and 1404c, respectively, are described by centers located at the reference points 1402a, 1402b and 1402c and radii corresponding to the adjusted distance values for the reference points as generated at operation 310 of FIG. 3. In an embodiment of operation 1306 (FIG. 13), wireless device 200 may determine that circles 1404b and 1404c do not intersect, and may modify the adjusted distance values (i.e., the radii) associated with those circles until circles 1404b and 1404c. In some embodiments, wireless device 200 may identify point 1406 on the line connecting reference points $RP_2$ 1402b and $RP_3$ 1402c. Point 1406 may be identified as the point at which the ratio of the distance between point 1406 and reference point $RP_2$ 1402b and the distance between point 1406 and reference point $RP_3$ 1402c is equal to the ratio of the distances between wireless device 200 and reference points $RP_2$ 1402b and $RP_3$ 1402c, respectively. In some embodiments, point 1406 ("P") is selected such that:

$$\frac{dist(P, RP_2)}{dist(P, RP_3)} = \frac{d_2}{d_3}, \quad (8)$$

where $d_2$ and $d_3$ represent the distances between wireless device 200 and reference points $RP_2$ 1402b and $RP_3$ 1402c, respectively. The distances between wireless device 200 and reference points $RP_2$ 1402b and $RP_3$ 1402c may be determined, for example, by applying a propagation model to the wireless signals received from reference points 1402b and 1402c, respectively, to generate predicted distances. Once wireless device 200 has identified point 1406, the radii of circles 1404b and 1404c (i.e., the adjusted distance values) are adjusted so that circles 1404b and 1404c intersect at point 1406. These operations may be repeated for any pairs of circles that do not suitably intersect until trilateration may be performed.

Figure 15:
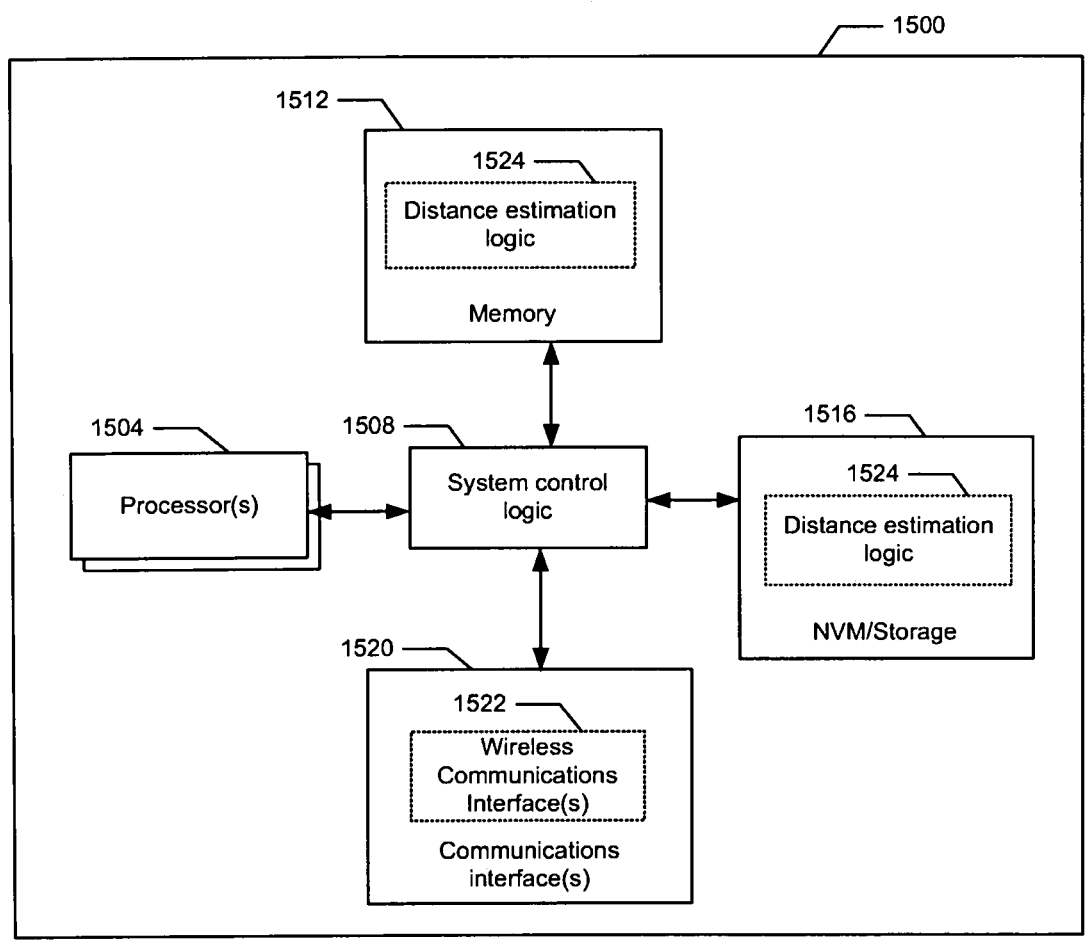
FIG. 15 illustrates an example computing device suitable for practicing the disclosed embodiments, in accordance with various embodiments.

FIG. 15 illustrates an embodiment of a computing device 1500 suitable for practicing embodiments of the present disclosure. As illustrated, computing device 1500 may include system control logic 1508 coupled to one or more processor(s) 1504, to system memory 1512, to non-volatile memory (NVM)/storage 1516, and to one or more communications interface(s) 1520. In various embodiments, the one or more processors 1504 may include a processor core.

In some embodiments, system control logic 1508 may include any suitable interface controllers to provide for any suitable interface to the processor(s) 1504 and/or to any suitable device or component in communication with system control logic 1508. System control logic 1508 may also interoperate with a display (not shown) for display of information, such as to a user. In various embodiments, the display may include one of various display formats and forms, such as, for example, liquid-crystal displays, cathode-ray tube displays, and e-ink displays. In various embodiments, the display may include a touch screen.

In some embodiments, system control logic 1508 may include one or more memory controller(s) (not shown) to provide an interface to system memory 1512. System memory 1512 may be used to load and store data and/or instructions, for example, for computing device 1500. System memory 1512 may include any suitable volatile memory, such as suitable dynamic random access memory ("DRAM"), for example.

In some embodiments, system control logic 1508 may include one or more input/output ("I/O") controller(s) (not shown) to provide an interface to NVM/storage 1516 and communications interface(s) 1520. NVM/storage 1516 may be used to store data and/or instructions, for example. NVM/storage 1516 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example. NVM/storage 1516 may include a storage resource that is physically part of a device on which computing device 1500 is installed or it may be accessible by, but not necessarily a part of, computing device 1500. For example, NVM/storage 1516 may be accessed by computing device 1500 over a network via the communications interface(s) 1520.

System memory 1512, NVM/storage 1516, and system control logic 1508 may include, in particular, temporal and persistent copies of distance estimation logic 1524. The distance estimation logic 1524 may include instructions that, when executed by at least one of the processor(s) 1504, result in computing device 1500 practicing one or more aspects of wireless device 200 (FIG. 2) described above. Communications interface(s) 1520 may provide an interface for computing device 1500 to communicate over one or more network(s) and/or with any other suitable device. Communications interface(s) 1520 may include any suitable hardware and/or firmware, such as a network adapter, one or more antennas (such as antenna 202 of FIG. 2), wireless interface(s) 1522, and so forth. In various embodiments, communication interface(s) 1520 may include an interface for computing device 1500 to use NFC, optical communications (e.g., barcodes), or other similar technologies to communicate directly (e.g., without an intermediary) with another device. In various embodiments, wireless interface(s) 1522 may interoperate with radio communications technologies such as, for example, WCDMA, GSM, LTE, Bluetooth, Zigbee, and the like.

Depending on which modules of wireless device 200 (FIG. 2) are hosted by computing device 1500, the capabilities and/or performance characteristics of processors 1504, memory 1512, and so forth, may vary. In various embodiments, when used to host receiver module 204, computing device 1500 may include, but is not limited to, a smartphone, a computing tablet, a ultrabook, an e-reader, a laptop computer, a desktop computer, a set-top box, a game console, or a server. In various embodiments, when used to host spatial arrangement memory module 208 (FIG. 2), computing device 1500 may be, but not limited to, one or more servers known in the art.

In some embodiments, at least one of the processor(s) 1504 may be packaged together with system control logic 1508 and/or distance estimation logic 1524. In some embodiments, at least one of the processor(s) 1504 may be packaged together with system control logic 1508 and/or distance estimation logic 1524 to form a System in Package ("SiP"). In some embodiments, at least one of the processor(s) 1504 may be integrated on the same die with system control logic 1508 and/or distance estimation logic 1524. In some embodiments, at least one of the processor(s) 1504 may be integrated on the same die with system control logic 1508 and/or distance estimation logic 1524 to form a System on Chip ("SoC").

The following paragraphs describe examples of various embodiments.

In various embodiments, at least one machine-accessible medium may include instructions stored thereon that are configured to cause a wireless device, in response to execution of the instructions by the wireless device, to: receive, by the wireless device, a plurality of wireless signals transmitted from a corresponding plurality of reference points in a spatial arrangement; identify a reference point of the plurality of reference points that is closest to the wireless device based on the plurality of received wireless signals and a propagation model; generate, for each of the plurality of reference points, an arrangement-based distance value representative of the distance between the wireless device and the reference point based at least in part on the closest reference point and the spatial arrangement; adjust the propagation model based at least in part on one or more of the plurality of received wireless signals and one or more of the arrangement-based distance values; generate, for each of the plurality of reference points, an adjusted distance value representative of the distance between the reference point and the wireless device based at least in part on the corresponding received wireless signal and the adjusted propagation model; and estimate the location of the wireless device based on the spatial arrangement and the adjusted distance values.

In some embodiments, identify a reference point of the plurality of reference points that is closest to the wireless device based on the plurality of received wireless signals and a propagation model may include: determine, for each of the plurality of received wireless signals, a received signal strength value; and generate, for each of the plurality of reference points, a strength-based distance value representative of a distance between the reference point and the wireless device, based at least in part on the corresponding received signal strength value and the propagation model. The closest reference point may correspond to the smallest strength-based distance value.

In some embodiments, generate, for each of the plurality of reference points, the arrangement-based distance value may include: generate an upper bound on the distance between the reference point and the wireless device based on the spatial arrangement and the closest reference point. The arrangement-based distance value may be the upper bound.

In some embodiments, generate the upper bound on the distance between the closest reference point and the wireless device may include: determine a spatial location that is maximally distant from the closest reference point but closer to the closest reference point than to any other reference point according to the spatial arrangement; and calculate a distance between the spatial location and the closest reference point. The calculated distance may be the upper bound.

In some embodiments, generate the upper bound on the distance between the closest reference point and the wireless device may include sum a plurality of distances, including a distance between the closest reference point and a location of the wireless device at a previous time and a distance traveled by the wireless device since the previous time. The sum may be the upper bound.

In some embodiments, for each reference point other than the closest reference point, generate the upper bound on the distance between the other reference point and the wireless device may include sum the upper bound on the distance between the closest reference point and the wireless device and a distance between the closest reference point and the other reference point according to the spatial arrangement. The sum may be the upper bound.

In some embodiments, adjust the propagation model based at least in part on one or more of the plurality of received wireless signals and one or more of the arrangement-based distance values may include, for each of the plurality of reference points: calculate a first version of a parameter of the propagation model based at least in part on the corresponding received wireless signal, calculate a second version of the parameter of the propagation model based at least in part on the arrangement-based distance value, and generate a reference point-specific propagation model correction value based at least in part on the first and second versions of the parameter. Adjust the propagation model based at least in part on one or more of the plurality of received wireless signals and one or more of the arrangement-based distance values may also include adjust the propagation model based at least in part on one or more of the reference point-specific propagation model correction values.

In some embodiments, the propagation model may include a path loss model and the parameter of the propagation model may be a path loss. In some embodiments, adjust the propagation model based at least in part on one or more of the plurality of received wireless signals and one or more of the arrangement-based distance values may include: aggregate two or more of the reference point-specific propagation model correction values into an aggregate propagation model correction value and adjust the propagation model based on the aggregate propagation model correction value. In some embodiments, aggregate two or more of the reference point-specific propagation model correction values into an aggregate propagation model correction value may include: calculate a weighted combination of two or more of the reference point-specific propagation model correction values, wherein the weighted combination may be the aggregate propagation model correction value. In some embodiments, a weight associated with a reference point-specific propagation model correction value may be based at least in part on how close the corresponding reference point is to the wireless device based on one or more of the plurality of received wireless signals.

In some embodiments, the at least one machine-accessible medium may further include instructions stored thereon that are configured to cause the wireless device, in response to execution of the instructions by the wireless device, to: select at least three of the reference points, and when the adjusted distance values corresponding to the selected reference points describe circles that do not overlap suitably to trilaterate the wireless device with reference to the selected reference points, modify one or more of the adjusted distance values corresponding to the selected reference points by increasing or decreasing until the adjusted distance values corresponding to the selected reference points describe circles that overlap suitably to trilaterate the wireless device with reference to the selected reference points. Estimating a location of the wireless device based on the spatial arrangement and the adjusted distance values may include trilaterating the location of the wireless device based on the spatial arrangement and the adjusted distance values after the modification of the one or more of the adjusted distance values.

In some embodiments, estimate a location of the wireless device based on the spatial arrangement and the adjusted distance values may include multilaterate the location of the wireless device based on the spatial arrangement and the adjusted distance values.

In various embodiments, a wireless device for wireless communication, including estimation of a current location of the wireless device, may include: an antenna; a receiver module, coupled to the antenna, for receiving a plurality of wireless signals transmitted from a corresponding plurality of reference points in a spatial arrangement; a closest reference point identification module for identifying a reference point of the plurality of reference points that is closest to the wireless device based on the plurality of received wireless signals and a propagation model; an arrangement-based distance generation module for generating, for each of the plurality of reference points, an arrangement-based distance value representative of the distance between the wireless device and the reference point based at least in part on the closest reference point and the spatial arrangement; a propagation model adjustment module for adjusting the propagation model based at least in part on one or more of the plurality of received wireless signals and one or more of the arrangement-based distance values; an adjusted distance generation module for generating, for each of the plurality of reference points, an adjusted distance value representative of the distance between the reference point and the wireless device based at least in part on the corresponding received wireless signal and the adjusted propagation model; and a location estimation module for estimating the location of the wireless device based on the spatial arrangement and the adjusted distance values.

In some embodiments, the receiver module may be configured to wirelessly download a spatial data set including data representative of the spatial arrangement. In some embodiments, the data representative of the spatial arrangement may include data representative of a floor of a building on which each of the plurality of reference points is located. In some embodiments, the spatial data set may further include data representative of a boundary of a building in which the closest reference point is located. In some embodiments, at least a portion of the spatial data set may be extracted from one or more reference point frames transmitted by one or more of the plurality of reference points. In some embodiments, at least one of the plurality of reference points may include a wireless access point.

In various embodiments, an apparatus for wireless communication, including estimation of a current location of the apparatus, may include: means for receiving a plurality of wireless signals transmitted from a corresponding plurality of reference points in a Spatial arrangement; means for identifying a reference point of the plurality of reference points that is closest to the apparatus based on the plurality of received wireless signals and a propagation model; means for generating, for each of the plurality of reference points, an arrangement-based distance value representative of the distance between the apparatus and the reference point based at least in part on the closest reference point and the spatial arrangement; means for adjusting the propagation model based at least in part on one or more of the plurality of received wireless signals and one or more of the arrangement-based distance values; means for generating, for each of the plurality of reference points, an adjusted distance value representative of the distance between the reference point and the apparatus based at least in part on the corresponding received wireless signal and the adjusted propagation model; and means for estimating the location of the apparatus based on the spatial arrangement and the adjusted distance values.

In some embodiments, the apparatus may include: means for selecting at least three of the reference points; and means for, when the adjusted distance values corresponding to the selected reference points describe circles that do not overlap suitably to trilaterate the apparatus with reference to the selected reference points, modifying one or more of the adjusted distance values corresponding to the selected reference points by increasing or decreasing until the adjusted distance values corresponding to the selected reference points describe circles that overlap suitably to trilaterate the apparatus with reference to the selected reference points. The means for estimating a location of the apparatus based on the spatial arrangement and the adjusted distance values may include means for trilaterating the location of the apparatus based on the spatial arrangement and the adjusted distance values after the modification of the one or more of the adjusted distance values.

In some embodiments, the means for estimating a location of the apparatus based on the spatial arrangement and the adjusted distance values may include means for multilaterating the location of the apparatus based on the spatial arrangement and the adjusted distance values. In various embodiments, a method for estimating a current location of a wireless device may include operations performed by the wireless device in response to execution of the instructions included in the at least one machine-accessible medium described above. In some embodiments, the method may include selecting at least three of the reference points, and when the adjusted distance values corresponding to the selected reference points describe circles that do not overlap suitably to trilaterate the wireless device with reference to the selected reference points, modifying one or more of the adjusted distance values corresponding to the selected reference points by increasing or decreasing until the adjusted distance values corresponding to the selected reference points describe circles that overlap suitably to trilaterate the wireless device with reference to the selected reference points. Estimating a location of the wireless device based on the spatial arrangement and the adjusted distance values may include trilaterating the location of the wireless device based on the spatial arrangement and the adjusted distance values after the modifying of the one or more of the adjusted distance values. In some embodiments, estimating a location of the wireless device based on the spatial arrangement and the adjusted distance values may include multilaterating the location of the wireless device based on the spatial arrangement and the adjusted distance values.

Computer-readable media (including non-transitory computer-readable media), methods, systems and devices for performing any of the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory machine-accessible medium comprising instructions stored thereon that are configured to cause a wireless device, in response to execution of the instructions by the wireless device, to:
    receive, by the wireless device, a plurality of wireless signals transmitted from a corresponding plurality of reference points in a spatial arrangement;
    identify a reference point of the plurality of reference points that is closest to the wireless device based on the plurality of received wireless signals and a propagation model;
    generate, for each of the plurality of reference points, an arrangement-based distance value representative of the distance between the wireless device and the reference point based at least in part on the closest reference point and the spatial arrangement;
    adjust the propagation model based at least in part on one or more of the plurality of received wireless signals and one or more of the arrangement-based distance values;
    generate, for each of the plurality of reference points, an adjusted distance value representative of the distance between the reference point and the wireless device based at least in part on the corresponding received wireless signal and the adjusted propagation model; and
    estimate the location of the wireless device based on the spatial arrangement and the adjusted distance values.

2. The at least one machine-accessible medium of claim 1, wherein identify a reference point of the plurality of reference points that is closest to the wireless device based on the plurality of received wireless signals and a propagation model comprises:

determine, for each of the plurality of received wireless signals, a received signal strength value; and generate, for each of the plurality of reference points, a strength-based distance value representative of a distance between the reference point and the wireless device, based at least in part on the corresponding received signal strength value and the propagation model;

wherein the closest reference point corresponds to the smallest strength-based distance value.

3. The at least one machine-accessible medium of claim 1, wherein generate, for each of the plurality of reference points, the arrangement-based distance value comprises:

generate an upper bound on the distance between the reference point and the wireless device based on the spatial arrangement and the closest reference point;

wherein the arrangement-based distance value is the upper bound.

4. The at least one machine-accessible medium of claim 3, wherein, for the closest reference point, generate the upper bound on the distance between the closest reference point and the wireless device comprises:

determine a spatial location that is maximally distant from the closest reference point but closer to the closest reference point than to any other reference point according to the spatial arrangement; and calculate a distance between the spatial location and the closest reference point;

wherein the calculated distance is the upper bound.

5. The at least one machine-accessible medium of claim 3, wherein, for the closest reference point, generate the upper bound on the distance between the closest reference point and the wireless device comprises:

sum a plurality of distances, including a distance between the closest reference point and a location of the wireless device at a previous time and a distance traveled by the wireless device since the previous time;

wherein the sum is the upper bound.

6. The at least one machine-accessible medium of claim 3, wherein, for each reference point other than the closest reference point, generate the upper bound on the distance between the other reference point and the wireless device comprises:

sum the upper bound on the distance between the closest reference point and the wireless device and a distance between the closest reference point and the other reference point according to the spatial arrangement;

wherein the sum is the upper bound.

7. The at least one machine-accessible medium of claim 1, wherein adjust the propagation model based at least in part on one or more of the plurality of received wireless signals and one or more of the arrangement-based distance values comprises:

for each of the plurality of reference points:
calculate a first version of a parameter of the propagation model based at least in part on the corresponding received wireless signal,
calculate a second version of the parameter of the propagation model based at least in part on the arrangement-based distance value, and
generate a reference point-specific propagation model correction value based at least in part on the first and second versions of the parameter; and adjust the propagation model based at least in part on one or more of the reference point-specific propagation model correction values.

8. The at least one machine-accessible medium of claim 7, wherein the propagation model comprises a path loss model and the parameter of the propagation model is a path loss.

9. The at least one machine-accessible medium of claim 7, wherein adjust the propagation model based at least in part on one or more of the plurality of received wireless signals and one or more of the arrangement-based distance values further comprises:

aggregate two or more of the reference point-specific propagation model correction values into an aggregate propagation model correction value; and adjust the propagation model based on the aggregate propagation model correction value.

10. The at least one machine-accessible medium of claim 9, wherein aggregate two or more of the reference point-specific propagation model correction values into an aggregate propagation model correction value comprises:

calculate a weighted combination of two or more of the reference point-specific propagation model correction values;

wherein the weighted combination is the aggregate propagation model correction value.

11. The at least one machine-accessible medium of claim 10, wherein a weight associated with a reference point-specific propagation model correction value is based at least in part on how close the corresponding reference point is to the wireless device based on one or more of the plurality of received wireless signals.

12. The at least one machine-accessible medium of claim 1, further comprising instructions stored thereon that are configured to cause the wireless device, in response to execution of the instructions by the wireless device, to:

select at least three of the reference points; and when the adjusted distance values corresponding to the selected reference points describe circles that do not overlap suitably to trilaterate the wireless device with reference to the selected reference points, modify one or more of the adjusted distance values corresponding to the selected reference points by increasing or decreasing until the adjusted distance values corresponding to the selected reference points describe circles that overlap suitably to trilaterate the wireless device with reference to the selected reference points;

wherein estimate a location of the wireless device based on the spatial arrangement and the adjusted distance values comprises trilaterate the location of the wireless device based on the spatial arrangement and the adjusted distance values after the modification of the one or more of the adjusted distance values.

13. The at least one machine-accessible medium of claim 1, wherein estimate a location of the wireless device based on the spatial arrangement and the adjusted distance values comprises multilaterate the location of the wireless device based on the spatial arrangement and the adjusted distance values.

14. A method for estimating a current location of a wireless device comprising operations performed by the wireless device in response to execution of the instructions included in the at least one machine-accessible medium of claim 1.

15. The method of claim 14, further comprising:

selecting at least three of the reference points; and when the adjusted distance values corresponding to the selected reference points describe circles that do not overlap suitably to trilaterate the wireless device with reference to the selected reference points, modifying one or more of the adjusted distance values corresponding to the selected reference points by increasing or decreasing until the adjusted distance values corresponding to the selected reference points describe circles that overlap suitably to trilaterate the wireless device with reference to the selected reference points;

wherein estimating a location of the wireless device based on the spatial arrangement and the adjusted distance values comprises trilaterating the location of the wireless device based on the spatial arrangement and the adjusted distance values after the modifying of the one or more of the adjusted distance values.

16. The method of claim 14, wherein estimating a location of the wireless device based on the spatial arrangement and the adjusted distance values comprises multilaterating the location of the wireless device based on the spatial arrangement and the adjusted distance values.

17. A wireless device for wireless communication, including estimation of a current location of the wireless device, the wireless device comprising:
  an antenna;
  a receiver module, coupled to the antenna, for receiving a plurality of wireless signals transmitted from a corresponding plurality of reference points in a spatial arrangement;
  a closest reference point identification module for identifying a reference point of the plurality of reference points that is closest to the wireless device based on the plurality of received wireless signals and a propagation model;
  an arrangement-based distance generation module for generating, for each of the plurality of reference points, an arrangement-based distance value representative of the distance between the wireless device and the reference point based at least in part on the closest reference point and the spatial arrangement;
  a propagation model adjustment module for adjusting the propagation model based at least in part on one or more of the plurality of received wireless signals and one or more of the arrangement-based distance values;
  an adjusted distance generation module for generating, for each of the plurality of reference points, an adjusted distance value representative of the distance between the reference point and the wireless device based at least in part on the corresponding received wireless signal and the adjusted propagation model; and
  a location estimation module for estimating the location of the wireless device based on the spatial arrangement and the adjusted distance values.

18. The wireless device of claim 17, wherein the receiver module is configured to wirelessly download a spatial data set including data representative of the spatial arrangement.

19. The wireless device of claim 18, wherein the data representative of the spatial arrangement includes data representative of a floor of a building on which each of the plurality of reference points is located.

20. The wireless device of claim 18, wherein the spatial data set further includes data representative of a boundary of a building in which the closest reference point is located.

21. The wireless device of claim 18, wherein at least a portion of the spatial data set is extracted from one or more reference point frames transmitted by one or more of the plurality of reference points.

22. The wireless device of claim 18, wherein at least one of the plurality of reference points comprises a wireless access point.

23. An apparatus for wireless communication, including estimation of a current location of the apparatus, the apparatus comprising:
  means for receiving a plurality of wireless signals transmitted from a corresponding plurality of reference points in a spatial arrangement;
  means for identifying a reference point of the plurality of reference points that is closest to the apparatus based on the plurality of received wireless signals and a propagation model;
  means for generating, for each of the plurality of reference points, an arrangement-based distance value representative of the distance between the apparatus and the reference point based at least in part on the closest reference point and the spatial arrangement;
  means for adjusting the propagation model based at least in part on one or more of the plurality of received wireless signals and one or more of the arrangement-based distance values;
  means for generating, for each of the plurality of reference points, an adjusted distance value representative of the distance between the reference point and the apparatus based at least in part on the corresponding received wireless signal and the adjusted propagation model; and
  means for estimating the location of the apparatus based on the spatial arrangement and the adjusted distance values.

24. The apparatus of claim 23, further comprising:
  means for selecting at least three of the reference points; and
  means for, when the adjusted distance values corresponding to the selected reference points describe circles that do not overlap suitably to trilaterate the apparatus with reference to the selected reference points, modifying one or more of the adjusted distance values corresponding to the selected reference points by increasing or decreasing until the adjusted distance values corresponding to the selected reference points describe circles that overlap suitably to trilaterate the apparatus with reference to the selected reference points;
  wherein the means for estimating a location of the apparatus based on the spatial arrangement and the adjusted distance values comprises means for trilaterating the location of the apparatus based on the spatial arrangement and the adjusted distance values after the modification of the one or more of the adjusted distance values.

25. The apparatus of claim 23, wherein the means for estimating a location of the apparatus based on the spatial arrangement and the adjusted distance values comprises means for multilaterating the location of the apparatus based on the spatial arrangement and the adjusted distance values.

* * * * *